United States Patent
Nadarajah (10) Patent No.: US 7,725,582 B2
(45) Date of Patent: May 25, 2010

(54) NETWORK BASED PROXY CONTROL OF CONTENT

(75) Inventor: Dinesh Nadarajah, Austin, TX (US)

(73) Assignee: AT & T Intellectual Property I, L.P., Reno, NV (US)

( * ) Notice: Subject to any disclaimer, the term of this patent is extended or adjusted under 35 U.S.C. 154(b) by 1055 days.

(21) Appl. No.: 10/339,310

(22) Filed: Jan. 10, 2003

(65) Prior Publication Data

US 2004/0148408 A1   Jul. 29, 2004

(51) Int. Cl.
*G06F 15/173*   (2006.01)
(52) U.S. Cl. ............................. 709/226; 726/17; 726/21
(58) Field of Classification Search .................... 705/51, 705/54; 726/4, 17–21; 709/219, 231–232, 709/226
See application file for complete search history.

(56) References Cited

U.S. PATENT DOCUMENTS

| | | | |
|---|---|---|---|
| 5,915,019 A | | 6/1999 | Ginter et al. |
| 5,991,810 A | * | 11/1999 | Shapiro et al. ............... 709/229 |
| 6,223,291 B1 | * | 4/2001 | Puhl et al. ...................... 726/28 |
| 6,363,357 B1 | | 3/2002 | Rosenberg et al. |
| 6,389,457 B2 | | 5/2002 | Lazaridis et al. |
| 6,697,944 B1 | * | 2/2004 | Jones et al. .................. 713/168 |
| 6,915,425 B2 | * | 7/2005 | Xu et al. ....................... 713/165 |
| 6,961,858 B2 | * | 11/2005 | Fransdonk ................... 380/281 |
| 6,987,987 B1 | * | 1/2006 | Vacanti et al. ............ 455/556.2 |
| 2001/0051996 A1 | | 12/2001 | Cooper et al. |
| 2002/0002674 A1 | | 1/2002 | Grimes et al. |
| 2002/0013772 A1 | | 1/2002 | Peinado |
| 2002/0042758 A1 | | 4/2002 | Deng |
| 2002/0042780 A1 | | 4/2002 | Yang |
| 2002/0065778 A1 | | 5/2002 | Bouet et al. |
| 2002/0069420 A1 | * | 6/2002 | Russell et al. .................. 725/92 |
| 2002/0111912 A1 | | 8/2002 | Hunter et al. |
| 2002/0178271 A1 | * | 11/2002 | Graham et al. .............. 709/229 |
| 2003/0126608 A1 | * | 7/2003 | Safadi et al. ................... 725/89 |
| 2003/0161476 A1 | * | 8/2003 | Fransdonk ................... 380/282 |
| 2004/0198308 A1 | * | 10/2004 | Hurst et al. .................. 455/403 |

OTHER PUBLICATIONS

A screen-shot of a website entitled "Authentica Introduces Authentica Policy Server, Enterprise Edition 3.0", from <http://www.authentica.com/news/press_releases/02-19-2002-policy_server_v3.asp>, downloaded no later than Sep. 27, 2002.
A screen-shot of a website entitled "Info2clear Launches SecureNewsletter at World Newspaper Congress", from, 2002. <http:www.info2clear.com/en/press_38.asp>, downloaded no later than Sep. 27, 2002.
A screen-shot of a website entitled "InterTrust Launches First Wireless Digital Rights Management Platform-Rights/Phone™", from <http://ir.intertrust.com/news/20000613-42651.cfm>, downloaded no later than Sep. 27, 2002.
A screen-shot of a website entitled "Rights to Bytes", from <http://www.mcommerctimes.com/Solutions/210>, accessed Sep. 27, 2002.

* cited by examiner

*Primary Examiner*—Shawki S Ismail
*Assistant Examiner*—Grant Ford
(74) *Attorney, Agent, or Firm*—Greenblum & Bernstein, P.L.C.

(57) ABSTRACT

A communications system serves as a proxy for a user device in a communications network. The communications system includes a network gateway that receives content in response to a user initiated content utilization attempt from a user device. A computer receives the content from the network gateway and, in response to receiving the content, determines whether the content utilization by the user can be permitted. The computer can also determine whether the content utilization by the user can be completed.

35 Claims, 8 Drawing Sheets

Proxy Permission and Completion Server
310

NETWORK BASED PROXY CONTROL OF CONTENT

BACKGROUND OF THE INVENTION

1. Field of the Invention

The present invention relates to the field of communications networks. More particularly, the present invention relates to enforcing digital rights when an end user device attempts to send, receive or utilize content using a communications network.

2. Background Information

A need exists to ensure that an ownership right to limit distribution and utilization of proprietary content is enforced when an attempt is made to transmit or receive the content using a communications network. Presently, many efforts to protect ownership rights on a network are based on limiting the functionality of the content when outside the domain of approved use. For example, a variety of current efforts to enforce an ownership right to limit utilization of content are based upon encryption before the content is distributed to users. Additionally, an owner may arrange for digital watermarks to be added to content before distribution to users. Moreover, an owner of content rights may rely on a digital signature of an authorized user or third-party certifying authority before the authorized user is provided with access to the content by a content distributor. However, encryption, watermarking and digital signatures schemes are not completely effective in preventing unauthorized decryption and electronic forgery, resulting in unauthorized distribution and utilization of the content. Without assurance that ownership rights can be adequately enforced, owners are withholding content from distribution on modern communications networks such as the internet.

Additionally, legacy communications devices may not support enforcement, control and management of digital rights when content distribution is otherwise possible over a modern communications network. Many user devices do not have sufficient memory or processing capability to support a licensing or digital rights management program. For example, a conventional cell phone has limited capability to support license control schemes for enforcement of digital rights.

Accordingly, a need exists to ensure that the transmission or receipt of content by a user is authorized by an owner of rights to the content before the transmission or receipt of the content over the communications network is permitted. Additionally, a need exists for a proxy to determine whether a content utilization or distribution, over a communications network, requested by a communications device is permitted by an owner of rights to the content.

To solve the above-described problems, a communications system is provided for ensuring that digital rights are enforced when a user attempts to initiate a network based content utilization.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawing, and in which.

DETAILED DESCRIPTION OF THE INVENTION

In view of the foregoing, the present invention, through one or more of its various aspects, embodiments and/or specific features or sub-components, is thus intended to bring out one or more of the advantages as specifically noted below.

In one aspect of the present invention, a communications system is provided that serves as a proxy for at least one user device in a communications network. The communications system includes a network gateway that receives content in response to a user initiated content utilization attempt from a user device. The communications system also includes a computer that receives the content from the network gateway and, in response to receiving the content, determines whether the content utilization can be permitted and completed.

In another aspect of the present invention, the communications system determines whether the content utilization can be permitted based upon an ID provided with the content.

In a further aspect of the present invention, the communications system retrieves information associated with the ID. The retrieved information is used to determine whether the content utilization is permitted.

In yet another aspect of the present invention, the communications system determines whether an owner of the content has permitted the content utilization.

In a further aspect of the present invention, the communications system includes a memory apparatus that stores information used to determine whether the content utilization is permitted.

In still another aspect of the present invention, the information includes license data.

In yet another aspect of the present invention, the information includes business rules data.

In another aspect of the present invention, the communications system includes a digital rights management (DRM) apparatus that stores digital rights management information related to the content. The digital rights management apparatus is queried in response to receiving the content.

In a further aspect of the present invention, a response to the query includes information used to determine whether the content utilization is permitted.

In still another aspect of the present invention, if the content utilization is permitted, the communications system determines whether the content utilization can be completed.

In yet another aspect of the present invention, the communications system determines whether the content utilization can be completed based upon an ID provided with the content.

In still another aspect of the present invention, the communications system retrieves information associated with the ID. The information is used to determine whether the content utilization can be completed.

In another aspect of the present invention, the communications system includes a memory apparatus that stores information used to determine whether the content utilization can be completed.

In a further aspect of the present invention, the information includes capability information describing capabilities of the user device.

In still another aspect of the present invention, the communications system determines whether the content utilization can be completed based upon data processing requirements of the content.

In another aspect of the present invention a method is provided that determines whether a user device is permitted to utilize content using a communications network. The method includes receiving the content from a network gateway of a communications service provider at a proxy in response to a user initiated content utilization attempt at the user device. The method also includes determining, at the proxy, whether the content utilization is permitted, in response to receiving the content at the proxy.

In a further aspect of the present invention, the determination whether the content utilization is permitted is based upon an ID provided with the content.

In still another aspect of the present invention, the method includes retrieving information associated with the ID. The information is used to determine whether the content utilization is permitted.

In yet another aspect of the present invention, the method includes querying a digital rights management apparatus that stores digital rights management information related to the content, in response to receiving the content at the proxy.

In another aspect of the present invention, a response to the query includes information used to determine whether the content utilization is permitted.

In a further aspect of the present invention, the method includes determining whether the content utilization can be completed, if the content utilization is permitted.

In still another aspect of the present invention, the method includes determining whether the content utilization can be completed based upon an ID provided with the content.

In a further aspect of the present invention, the method includes retrieving information associated with the ID and determining whether the content utilization can be completed using the retrieved information.

In still another aspect of the present invention, the method includes storing information used to determine whether the content utilization can be completed.

In yet another aspect of the present invention, the information includes capability information describing capabilities of the user device.

In a further aspect of the present invention, the method includes determining whether the content utilization can be completed based upon data processing requirements of the content.

In another aspect of the present invention, a computer readable medium is provided for storing a computer program that determines whether a user device is permitted to utilize content using a communications network. The computer readable medium includes a content receiving source code segment that receives the content from a network gateway of a communications service provider in response to a user initiated content utilization attempt at the user device. The computer readable medium also includes a permission determining source code segment that determines, at a proxy, whether the content utilization is permitted, in response to receiving the content at the proxy.

In a further aspect of the present invention, the computer readable medium also includes an information storing source code segment that stores information used to determine whether the content utilization is permitted.

In still another aspect of the present invention, the computer readable medium also includes a management querying source code segment that, in response to receiving the content, queries a digital rights management apparatus. The digital rights management apparatus stores digital rights management information related to the content.

In yet another aspect of the present invention, the computer readable medium includes a completion determining source code segment that, if the content utilization is permitted, determines whether the content utilization can be completed.

In a further aspect of the present invention, the computer readable medium includes an information retrieving source code segment that retrieves information associated with an ID that is provided with the content. The information retrieving source code segment also determines whether the content utilization can be completed using the retrieved information.

A system for network based proxy control of content is provided to ensure that a user device is permitted by an owner of a right to the content to send, receive or utilize content using a communications network. The system for network based content utilization includes a network gateway and a proxy permission and completion system that ensure a user initiated attempt to send, receive or utilize content is permitted and can be completed using the communications network. The system for network based content utilization also allows a user who creates original content to distribute the content and assign rights to the content using the communications network. The system for network based content utilization additionally allows a content distributor to distribute the content and assign rights to the content using the communications network.

The communications network may be a network or combination of networks, including wireline networks, wireless networks, or a combination of wireline and wireless networks. The network(s) may include, e.g., the internet or another network for packet switched transmission, a mobile messaging solutions (MMS) network, a satellite television or radio network, a cable network, the public switched telephone network (PSTN), an advanced intelligent network (AIN), a personal communication service (PCS) network, a code division multiple access (CDMA) network, a time division multiple access (TDMA) network, and a global system mobile (GSM) network. A network may also include a virtual private network (VPN) that provides secure and encrypted communications between nodes of the network. The networks noted herein are used as non-limiting examples; as used herein, the terms "network" and "networks" refer to any network or combination of networks that interconnect multiple devices and/or provide a medium for transmitting data from one device to another.

The network based content utilization system may be implemented by a communications service provider, for example a wireless service provider, an internet service provider, or a telecommunications service provider. User devices are user terminals that can send and receive communications over communications networks using, e.g., connections, receivers, transmitters and network gateways provided by communications service providers. Exemplary user devices include a wireless phone, a wireless access protocol (WAP) cellular phone, a personal digital assistant (PDA), a landline phone, a personal computer (PC), a handheld computer, a desktop computer, a laptop computer, a notebook computer, a mini computer, a workstation, a mainframe computer, a set top box for a television, a web-enabled television, an interactive kiosk, a mobile web browser, or any other type of device that permits access to the communications network. The exemplary user devices may include any conventional single or multi-chip microprocessor or special purpose microprocessor.

The network based content utilization system serves as a proxy to ensure that a communications device used by a system user (i.e., a user device) is permitted to send, receive or utilize content over the network before the content utilization or distribution is permitted to occur. Additionally, the network based content utilization system serves as a proxy for a communications device to ensure that the content utilization or distribution attempt can be completed using the user device.

The communications network includes a network gateway contacted by the user device to send, receive or utilize content using the communications network. The network gateway may be any intermediate communications apparatus used to process requests to transfer content to and from user devices. The network gateway may be a node of the communications network used to interface with additional communications networks. Of course, a communications network may include multiple network gateways at disparate geographic locations to process requests to transfer content to and from dispersed users.

According to the present invention, if multiple network gateways are used, each network gateway may be associated with a different proxy permission and completion system. For example, a network gateway and a proxy permission and completion system may reside on a common server associated with one or more memory apparatuses. However, a single common proxy permission and completion system may be provided for multiple network gateways in order to ensure that content rights are consistently enforced across the network. Additionally, multiple proxy permission and completion systems may be located regionally and each associated with network gateways in a different region. If proxy permission and completion systems are each associated with a single gateway, or if multiple proxy permission and completion systems are dispersed regionally, the multiple proxy permission and completion systems may communicate with each other or with a central proxy permission and completion system to synchronize information related to content that is utilized or distributed.

As an example of a network gateway, communications in a cellular network may be directed to one or more wireless network gateways that interface with additional networks, for example the internet and/or the public switched telephone network. A wireless network gateway also communicates with individual cell sites or cell towers that are in contact directly with user devices. In a wireless messaging network, for example a multimedia messaging solutions (MMS) network, communications may be directed from cell sites to wireless messaging gateways, such as a multimedia messaging solutions gateway.

In the example of the wireless network gateway, the gateway interfaces with an additional network and allows the user of a wireless mobile communications device to send, receive and utilize content over the additional network. For example, the wireless network gateway may interface with the internet and/or the public switched telephone network.

The network gateway processes user attempts to send, receive or utilize content. For example, an internet user connected to an internet server of an internet service provider through, for example, dial-up or broadband, will have requests processed by the internet server. Similarly, a wireless network user communicating with a wireless gateway through, for example, a cell tower, will have requests processed by the wireless gateway.

When the user attempts to send, receive or utilize content using the network gateway, the network gateway is used to determine whether the content utilization can be permitted and completed. The network gateway forwards the content to the proxy permission and completion system and the proxy permission and completion system serves as a proxy for the user device in order to determine whether the content utilization can be permitted and completed.

Content can be software, for example a digital representation of a book, audio file, movie, live event or text file. The content can be formatted in, e.g., PDF, JPEG, MPEG, WAV, HTML, or any other format used to present content to a user. Content may also be functional software that is installed as an upgrade on a user device. Content can be stored in a memory apparatus or transmitted as a file or data stream across the network for immediate utilization at a user device.

An owner of content rights may attempt to limit distribution and utilization of content by, for example, encrypting or digitally watermarking the content. A typical encryption scheme involves the use of a pair of related keys. Content is encrypted using a public key that is made available by the user device. A private key is used by the user device to decrypt content encrypted using the public key. The private key decryption may be based on, for example, a serial number of the user device that is set at the factory when the user device is manufactured. Therefore, content can be encrypted so that only a user device with the private key can decrypt the content. Additionally, content can be watermarked with licensing information so that unauthorized use of the content can be detected.

The system for network based content utilization can operate with encrypted and watermarked content. For example, the proxy permission and completion system will serve as a proxy for a communications device when content is requested from a content distributor. Accordingly, a public key associated with the proxy permission and completion system can be sent when content is requested from a content distributor. The content distributor forwards encrypted content to the proxy permission and completion system for decryption. When the content is decrypted at the proxy permission and completion system, the proxy permission and completion system forwards the decrypted content to the requesting user device. Accordingly, a user device that does not support an encryption/decryption scheme can receive decrypted content over the communications network using the proxy permission and completion system.

The proxy permission and completion system is used to determine whether the content utilization is authorized. The proxy permission and completion system will determine if the content is registered by, for example, determining whether a content ID is embedded in the content or otherwise associated with the content. A content ID can be a digital registration generated for the content by a communications service provider that provides the system for network based content utilization. The content ID may be, for example, a digital watermark embedded in the content, a flag, an extensible markup language tag, an alpha-numeric ID, a file header, a supplemental ID file that is associated with the content, or any other manner of ID that uniquely identifies the content to the system for network based content utilization. If the content ID is embedded in the file as, for example, a watermark, the content ID is designed to withstand any of a variety of digital content transformations used, e.g., to perform image processing such as 16:9 conversion, NTSC conversion or any other compression or enhancement scheme.

If the content is not yet registered, e.g., if the content is newly created or newly distributed on the network, the system will determine if any licensing information exists for the content. The determination whether license information exists may include searching for watermarks, content licenses, digital certificates, or any other form of conventional marking for protected content. The proxy permission and completion system is provided with detection logic that allows the detection of license information. Because the system for network based content utilization enhances digital rights management protection, content distributors facilitate content license and digital rights management information detection.

In an embodiment, a content distributor may be designated as a "trusted" content distributor by the system for network based content utilization. The trusted content distributor generates new content IDs for content according to the method used to generate new content IDs by the proxy permission and completion system. Accordingly, when content is received from a trusted content distributor, the content is pre-registered. When the content ID is pre-registered by a trusted content distributor, the trusted content distributor forwards licensing information with the content. The license information is stored at the proxy permission and completion system when it is received from the trusted content distributor.

The system for network based content utilization may associate a trusted content distributor with a "standard", or easily determined, license term. Examples of a standard license term from a content distributor can include a time limit (e.g., content is only licensed for two days by the recipient) or a "recipient-only" term. Accordingly, content from, e.g., an on-demand content distributor, can be associated with a standard license term. Additionally, if the on-demand content distributor uses only a limited number of license terms, the on-demand content distributor can easily provide the license terms for a particular content file to the proxy permission and completion system by, for example, setting a flag or digitally imprinting a shortened digital code in a file header to indicate the standard terms of utilization and distribution that apply to a particular content file.

If license information or a content ID is not detected for content, the proxy permission and completion system will still attempt to determine if the user is entitled to utilize the content. For example, content may be imprinted with a notice that a content creator or distributor wishes to be notified if licensing information cannot be determined. If a notice, a license, a content ID and other licensing information is not found for the content, the proxy permission and completion system will create a content ID for the content, and associate the ID with the content for future use by, e.g., placing the ID in a file header or digitally marking the content with the content ID. The user device is then allowed to complete the requested utilization or distribution of the content. The ID is also stored in a memory apparatus of the proxy permission and completion system and is associated in the memory of the system with a virtual license created by the proxy permission and completion system, e.g., no restrictions exist for utilizing the email.

If a content ID or license information is detected for the content, the proxy permission and completion system will determine if the requested utilization or distribution conforms to the license terms. For example, a license file associated with the content may include a license expiration date and time, a distribute-to-only list of addresses or domains, or any other term that limits authorization for distribution and utilization of the content. If the requested utilization or distribution conforms to the license terms, the proxy permission and completion system notifies the network gateway that the utilization or distribution is authorized. Of course, a similar process occurs if a content ID is discovered by the proxy permission and completion system. A license file stored by the proxy permission and completion system, and associated with the content ID, is retrieved. If the requested utilization or distribution conforms to the license terms, the proxy permission and completion system notifies the network gateway that the utilization or distribution is authorized.

The network gateway also notifies the proxy permission and completion system if the user attempts to replay content by retrieving the content from a memory apparatus using the network gateway. Since the content has been utilized by the user previously, the proxy permission and completion system will recognize the content ID when the content is received from the network gateway. The system will determine the content ID and retrieve the licensing information to determine if the user can again receive (i.e., replay) the content.

The system can also determine whether the user device will support the completion of the requested utilization. For example, as wireless devices become more advanced, a communications network may offer more advanced licensing and encryption schemes. However, a legacy wireless device using the communications network to request content may not be able to complete the requested utilization or distribution of the content. As an example, a personal digital assistant may request streaming video content although the personal digital assistant does not have software to play streaming video.

The proxy permission and completion system will retrieve user device information from, for example, an original product license issued for the requesting user device. An original license for the user device may be associated in a memory with additional licenses for software downloads or peripherals associated with the user device. The product licenses for the user device, including the licenses for updates, may be stored in a memory device associated with the proxy permission and completion system.

The proxy permission and completion system compares the content utilization requirements with the user device specification information. If the user device specification information indicates that utilization of the content is supported according to the content information, the proxy permission and completion system may include in the permission notification to the network gateway a notification that the utilization of the content is supported by the user device.

If the proxy permission and completion system determines that the utilization of the content is not supported by the user device, the system may attempt to ascertain if, e.g., the user may upgrade the user device to support the content utilization. For example, if a personal digital assistant is not equipped with a PDF file viewer, the proxy permission and completion system may determine whether the personal digital assistant can obtain and install a PDF file viewer. If the PDF file viewer is available for download by the user device, the proxy permission and completion system notifies the user device through the network gateway that the content utilization requires an upgrade and that the upgrade is available.

The proxy permission and completion system may also process content and present the processed content to the user device. For example, the proxy permission and completion system may decrypt content that is then forwarded to the user device. Additionally, the proxy permission and completion system may, for example, process digital content using media player software to process content and forward the processed content for presentation at a user device. In the alternative, if a user device can support a content processor but does not have adequate permanent storage space to permanently store the content processor, the proxy permission and completion system may forward a content processor (e.g., a media player) to the user device for temporary use to process content.

If the user device cannot be upgraded to support the attempted content utilization, or if the user is unwilling to incur a cost to upgrade the user device, or if the proxy permission and completion system cannot process the content for presentation to the user device, the proxy permission and completion system will notify the user device through the network gateway that the attempted content utilization cannot be completed.

Figure 1:
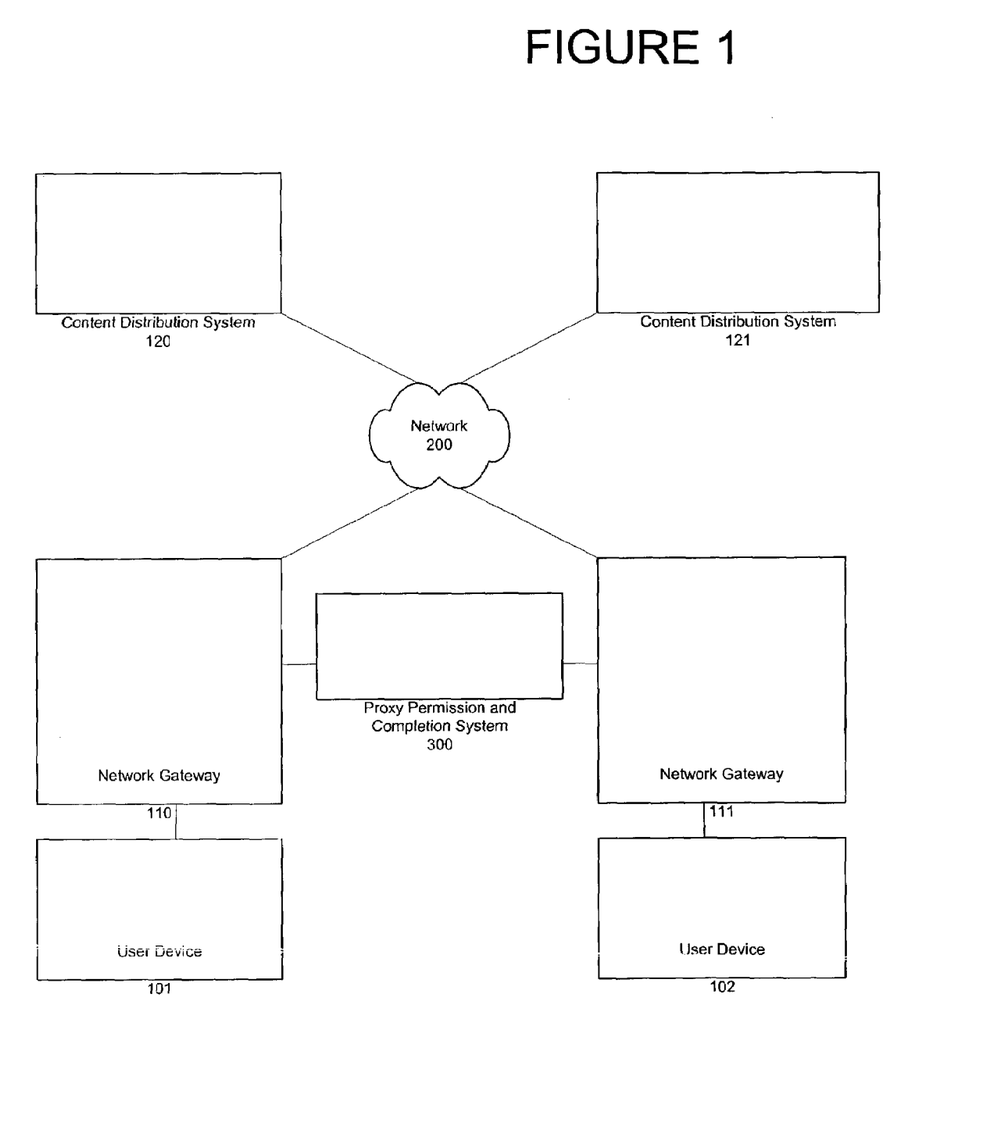
FIG. 1 shows an exemplary communications network architecture for the network based content utilization system, according to an aspect of the present invention.

FIG. 1 shows an exemplary communications network of the present invention. The user devices 101 and 102 communicate through the network gateways 110 and 111, respectively. The network based content utilization system includes the network gateways 110 and 111 and the proxy permission and completion system 300. The network gateways 110 and 111 interface with the network 200. The network 200 is connected to the content distribution systems 120 and 121. The network gateways 110 and 111 also communicate with the proxy permission and completion system 300. The proxy permission and completion system 300 may communicate with the network gateways 110 and 111 using e.g., an intranet, a wide area network, dedicated communication lines, a virtual private network using the internet, or any other type of secure, private communication network.

In an embodiment, user devices 101 and 102 are any wireless communications devices, for example, a wireless phone, a wireless access protocol (WAP) cellular phone, a personal digital assistant (PDA), a handheld computer, a laptop computer, or a mobile internet browser. Wireless communications devices communicate over an air interface to receivers and transmitters (e.g., cell sites) that, in turn, communicate with wireless gateways corresponding to network gateways 110 and 111. The network gateways interface with additional networks, for example the internet, corresponding to network 200. Content distribution systems 120 and 121 distribute content through network 200 to, e.g., users who pay a fee to utilize the content.

In another embodiment, the user devices 101 and 102 are personal computers, desktop computers, mini computers, mainframe computers or other devices that utilize hardware connections. The user devices 101 and 102 connect to network gateways 110 and 111 respectively, using, for example, a remote modem or a high-speed, dedicated data circuit. The network gateways 110 and 111 are internet servers that communicate using, e.g., transmission control protocol/internet protocol (TCP/IP). The internet server network gateways 110 and 111 include a server program that communicates with the user devices 101 and 102. Content distribution systems 120 and 121 are connected to the network 200 in order to distribute content to, e.g., users who pay a fee to utilize the content.

The internet server network gateways 110 and 111 receive requests from the user devices 101 and 102 to send, receive or utilize content over the communications network 200. A user device 101, 102 may initiate a request to retrieve, forward, copy, play or replay media content. In response to requests from the user devices 101 and 102, the content is forwarded to the network gateways 110 and 111. If the request is to replay media content that has already been licensed to a user device 101, 102, the content may be retrieved from, for example, a memory apparatus associated with the internet server network gateways 110 and 111. When the internet server network gateways 110 and 111 receive requests from the user devices 101 and 102 to send, receive or utilize content, the content is forwarded to the proxy permission and completion system 300 to determine if the content is registered. If the content is registered, the proxy permission and completion system 300 determines if the user request to send, receive or utilize the content complies with the license terms associated with the registration. If the proxy permission and completion system 300 determines that the user request does not comply with license terms for the registered content, the user device receives a notification that the requested activity is not permitted.

If the content is not registered, the proxy permission and completion system determines whether licensing information exists for the content. If licensing information is detected for the content, the proxy permission and completion system 300 will determine if the requested utilization or distribution conforms to the license terms. If the attempted utilization or distribution is permitted under the terms of the license, the proxy permission and completion system 300 allows the content utilization to occur according to the user's request. If licensing information is not detected for the content, the proxy permission and completion system 300 will perform additional tasks to determine if the user is entitled to utilize the content.

If the content is encrypted and the user device 101, 102 does not support a decryption scheme for the content, the proxy permission and completion system 300 may initiate a request for the content as a proxy for the user device 101, 102. The proxy permission and completion system 300 decrypts the content utilizing, e.g., a private key, and forwards the decrypted content to the user device 101, 102. In this case, the content is not encrypted between the network gateway and the user device 101, 102. In the alternative, the proxy permission and completion system may re-encrypt at a lower encryption level that the requesting user device 101, 102 can decrypt.

When content is forwarded from the content distributor 120, 121 to a user device 101, 102, the content distributor 120, 121 will provide licensing information that is recognizable to the proxy content and distribution system 300. The proxy content and permission system 300 will associate a digital ID with the content and associate the licensing information with the digital ID when the user device 101, 102 first attempts to send, receive or utilize the content. Accordingly, licensing information can be used to enforce digital rights for the content owner when content is utilized or distributed.

The proxy permission and completion system 300 is centrally positioned to communicate with multiple network gateways 110 and 111. The proxy permission and completion system 300 may be centrally positioned for network gateways or it may be a regional system that communicates with other regional proxy permission and completion systems (not shown) in order to ensure consistent enforcement of content rights.

If the proxy permission and completion system 300 cannot find a content ID, licensing information or information to indicate that the user is not entitled to utilize the content, the proxy permission and completion system 300 creates a content ID for the content and associates the ID with the content for future use. The proxy permission and completion system 300 registers the content by, for example, embedding an ID in the content. The ID is associated with the content in a memory apparatus (not shown) associated with the proxy permission and completion system 300 along with any license terms ascertained by the proxy permission and completion system 300. Of course, the terms of use may be unrestricted so that the content ID indicates that any utilization of the content is authorized. The user device 101, 102 is then allowed to complete the requested utilization or distribution of the content.

Figure 2:
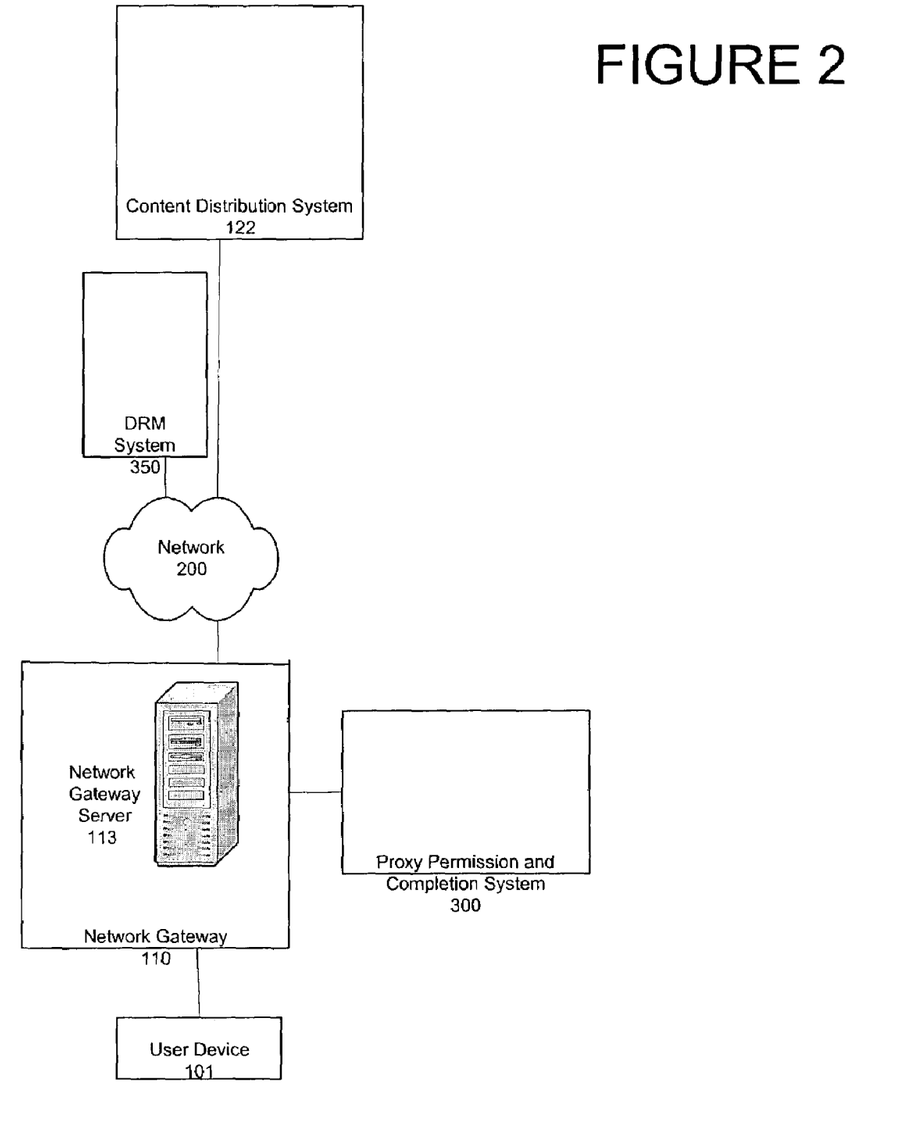
FIG. 2 shows another exemplary communications network architecture for the network based content utilization system, according to an aspect of the present invention.

FIG. 2 shows another exemplary communications network of the present invention. A user device 101 communicates with a network gateway 110. The user device 101 is a computer that includes any conventional single or multi-chip microprocessor or special purpose microprocessor or processor. Additionally, the user device 101 includes an addressable storage medium or computer accessible medium, such as random access memory (RAM), an electronically erasable programmable read-only memory, erasable programmable read-only memory, a hard disk, a floppy disk, a laser disk, a compact disk, or any other memory that stores electronic content such as programs and data.

The network based content utilization includes the network gateway 110 and the proxy permission and completion system 300. The user device 101 communicates with the network gateway 110 by, for example, a remote modem, ethernet, a wireless local area network (WLAN) or a wireless home radio frequency (RF) network. The network gateway communicates with a networked communications apparatus, for example a transmitter (not shown), a receiver (not shown), or another apparatus that sends and receives wireless signals to and from the user device 101. The network gateway 110 includes a network gateway server 113.

The network gateway server 113 is used to manage external communications for the user device 101. When the network gateway server 113 receives a request from the user device 101 to send, receive or utilize content, the network gateway server 113 forwards the content to the proxy permission and completion system 300.

The proxy permission and completion system 300 receives the content and determines whether the content is registered. If the content is registered, the proxy permission and completion system 300 determines if the user request to send, receive or utilize the content complies with the license terms associated with the registration. If the proxy permission and completion system 300 determines that the user request does not comply with license terms for the registered content, the user device 101 receives a notification that the requested activity is not permitted.

If the content is not registered, the proxy permission and completion system 300 determines whether licensing information exists for the content. The proxy permission and completion system 300 may contact a digital rights management (DRM) system 350 to determine licensing rights.

The digital rights management system 350 is a system used by content distributors to manage digital rights for distributed content. For example, the content distribution system 122 may forward proprietary content to the digital rights management system 350 which may store and later send the content to user devices 101, 102 upon request. Additionally, the content distribution system 122 may forward a license or rules and controls to the digital rights management system 350. A copy of the content license and/or rules and controls is stored at the DRM system 350. A user contacts the DRM system 350 or the content distribution system 122 directly in order to obtain the content.

The content may be marked to indicate that the DRM system 350 should be contacted by the system for network based proxy control of content to determine license information if the license information cannot otherwise be determined upon examination. Accordingly, if an external end user (not shown) forwards the content to the user device 101, the proxy permission and completion system 300 will examine the content and contact the digital rights management system 350 upon determining that the content is marked to indicate licensing information is stored at the digital rights management system 350. In other words, the proxy permission and completion system 300 determines whether distribution and utilization of content is permitted even when the content distribution system 122 and or DRM system 350 is not contacted by a user to obtain the content.

The content distribution system 122 and/or DRM system 350 may analyze usage of the content based on, for example, requests made by user devices 101, 102. Additionally, the DRM system 350 may act as a distributor, administrator, authorization clearinghouse and/or encrypter of the content on behalf of the content distribution system 122. For example, the DRM system 350 may analyze information of a user's profile to determine, for example, a credit worthiness or payment authorization of the user making the request to distribute or utilize the content.

The digital rights management system 350 is contacted by the proxy permission and completion system 300 and, upon identifying the digitally marked content, obtains and forwards a license for the content to the proxy permission and completion system 300. If the license includes a right for the external end user to forward or otherwise distribute copies of the content, the digital rights management system 350 informs the proxy permission and completion system 300 that distribution is authorized. If the attempted utilization is not permitted under the terms of the license, the proxy permission and completion system 300 may refer the user device 101 to the digital rights management system 350 to obtain a valid license.

FIG. 2 also shows an exemplary content distribution system 122. The content distribution system 122 receives requests via the network 200 from network users that wish to obtain proprietary content. The content distribution system 122 may be, for example, a video on demand system, a storehouse system for digital images, a gaming software provider, a news distribution system, an information service, or a music publisher system. The content distribution system 122 receives requests from users to obtain the proprietary content, retrieves the proprietary content, and forwards the content to the requesting user device 101. Additionally, the content distribution system 122 may forward a content license to the digital rights management system 350 so that service providers can retrieve the content license if unauthorized distribution or utilization of the content is suspected.

Figure 3:
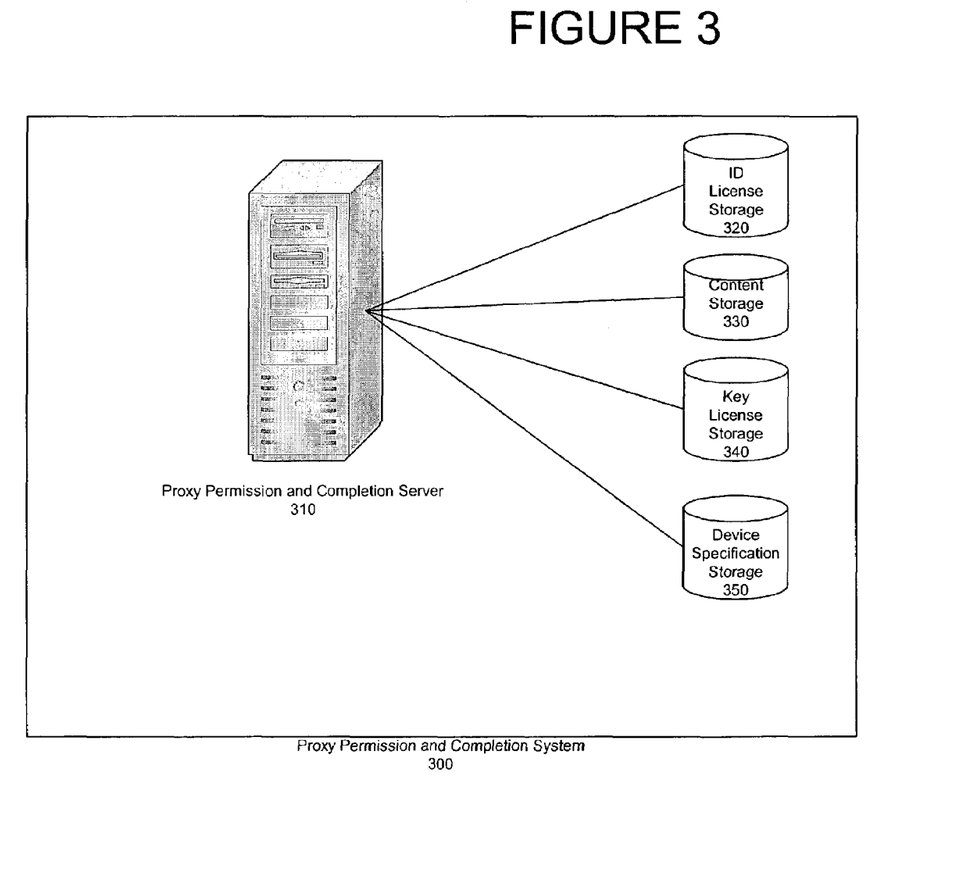
FIG. 3 shows an exemplary system architecture for a proxy permission and completion system, according to an aspect of the present invention.

FIG. 3 shows an exemplary proxy permission and completion system 300 of the present invention. The system includes a proxy permission and completion server 310, an ID license storage 320, a content storage 330, a key license storage 340, and a device specification storage 350.

The proxy permission and completion server 310 is used to communicate with network gateways when a user device 101, 102 attempts to send, receive or utilize content using the network 200. The proxy permission and completion server 310 stores data in the ID license storage 320, the content storage 330, the key license storage 340 and the device specification storage 340. Each of the storage devices may be, for example, a relational database or an object oriented database, used to store license information for IDs, content as requested by a content provider or user of a user device 101, 102, key information for decrypting content for a user, and user device specification data.

The ID license storage 320 stores license information that is associated with ID information used to identify content. The proxy permission and completion server 310 may obtain the license from the content distribution system 122, the digital rights management system 350, or directly from examination of the content. License information may be included in the ID when, for example, the license information includes a limited amount of information, e.g., no restriction on distribution or utilization. The license information stored at the ID license storage 320 may include information relating to a license expiration date, a prohibition on forwarding content, an interactive counter for counting the number of content transmissions to different users, a specified number of authorized recipients, etc. Additionally, a license may specify authorized destination addresses or domains for user devices 101 and 102 authorized to, for example, receive the content.

The content storage 330 may store content when, for example, a user device 101, 102 does not support storing the content directly. For example, a legacy wireless phone or handheld computer may not be capable of storing a particular software application. The legacy phone or computer requests the proxy permission and completion system 300 to store the application and to forward the application, or a data stream of content processed by the application, to the legacy phone or computer upon request.

Additionally, the content storage 330 may store, for example, a video or audio clip that has been licensed to a user for a specified period of time. The video clip may be, for example, a movie that cannot be stored at the user device 101, 102. The content storage 330 will retrieve the content at the user's request. The content storage 330 can forward the digital content to the user device 101, 102 in bulk files of a size tolerated by the user device 101, 102. The bulk files are forwarded individually in the sequence in which they are to be presented at the user device 101, 102. Accordingly, a user device 101, 102 may receive parts of a large file from the proxy permission and completion system 300 when the user device 101, 102 would not be able to receive the entire file at one time.

The key license storage 340 stores key information used to associate a license with an individual user device 101, 102. Key information is important when, for example, a content distribution system 300 associates a particular work with a single content ID for multiple users. The content ID is recognized by the proxy permission and completion system 300 in each copy of a particular content that is sent to multiple users. In order to avoid confusion regarding the particular content license that applies to a particular user device 101, 102, the key information will specify that a particular content is associated with a particular license for a particular user, though different licenses may exist for the otherwise identical content that is marked with a single content ID.

The device specification storage 350 is used to store device specifications of a user device 101, 102. The device specifications may be retrieved directly from the user device 101, 102, or may be retrieved using, e.g., a product certificate issued by a factory at the time a product is built. Additionally, the device specification storage 350 may store information from additional product certificates issued when a device is upgraded by, for example, downloading a particular software application.

The device specification storage 350 is used to retrieve device specifications in order to determine, for example, if a particular content is supported by a recipient user device 101, 102. For example, the proxy permission and completion system 300 may use device specification information to determine that a particular device does not include a color terminal, a keyboard, required processing ability or required storage. Accordingly, the proxy permission and completion system 300 uses the device specification storage 350 to determine if an attempt to distribute or utilize content can be completed at a destination user device 101, 102.

As discussed above, the proxy permission and completion system 300 determines whether a request is permitted. For example, the proxy permission and completion system 300 may determine if the content is registered by determining whether a digital ID is provided with the content. If the content is not registered, the proxy permission and completion system 300 determines whether licensing information exists for the content by, for example, searching for an indication that a content owner wishes to restrict utilization and distribution of the content.

If the content is registered, the proxy permission and completion server 310 retrieves information from the ID license storage 320 and/or the key license storage 340, and compares the license information with the request. If the content is not registered, and if licensing information is not detected for the content, the proxy permission and completion server 310 may perform additional tasks to determine if the user is entitled to utilize the content. If the proxy permission and completion server 310 finds no indications that utilization and distribution of content is restricted, a content ID is created for the content and associated with the content for future use. The requesting user device 101, 102 is then allowed to complete the requested utilization or distribution of the content.

Figure 4:
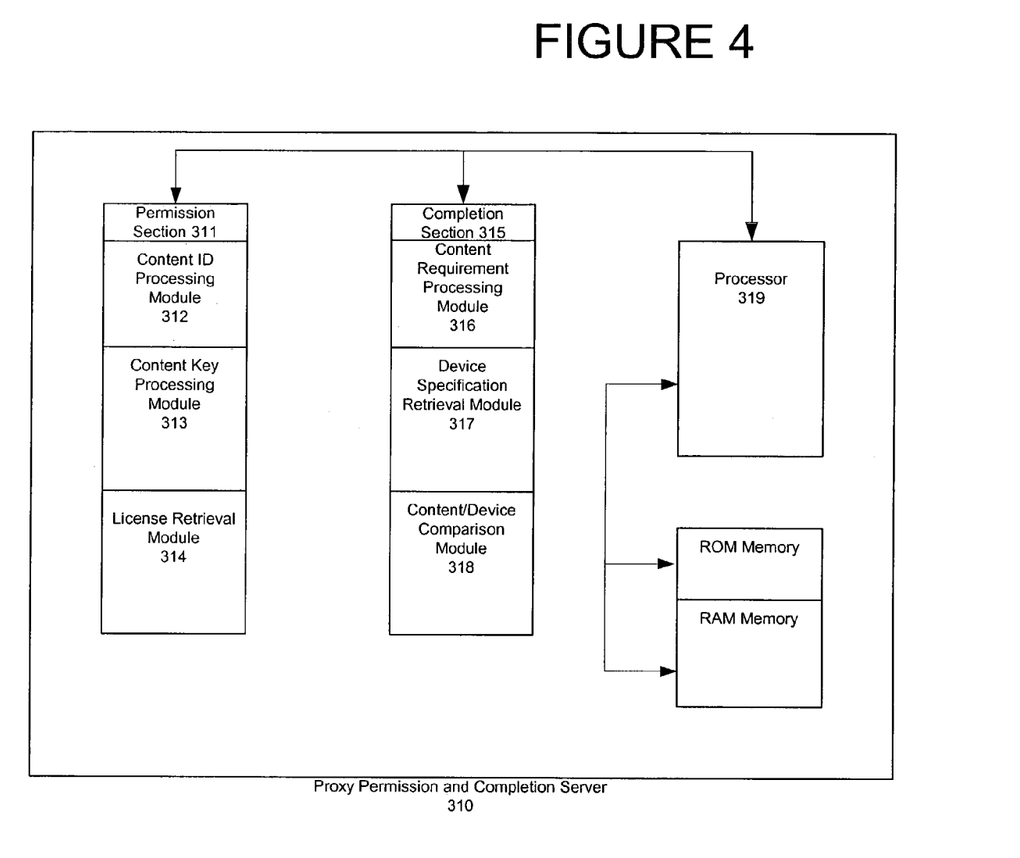
FIG. 4 shows an exemplary server architecture for a proxy permission and completion server, according to an aspect of the present invention.

FIG. 4 shows an exemplary layout of the proxy permission and completion server 310 of the present invention. The server 310 includes a permission section 311, a completion section 315, a processor 319 and a memory (not numbered). The permission section 311 includes a content ID processing module 312 for processing content to determine if a content ID exists by examining content that a user device 101, 102 is attempting to send, receive or utilize. The permission section 311 also includes a content key processing module 313 for processing content to determine if a key exists for the content that a user is attempting to send, receive or utilize. A license retrieval module 314 is also provided to retrieve a license associated with a content ID and/or content key found by the content ID processing module 312 and the content key processing module 313.

The completion section 315 includes a content requirement processing module 316 to determine any, e.g., processing or memory requirements, needed for content utilization. A device specification retrieval module 317 is also provided to retrieve product specifications of a user device 101, 102 that is to utilize the content. A content/device comparison module 318 is provided to compare the content processing and memory requirements with the retrieved device specifications. The comparison at the content/device comparison module 318 determines if the user device 101, 102 will support utilization of the content.

The processor 319 is provided to execute applications stored in the memory. The processor 319 retrieves instructions from the permission system 311, the completion section 315 and the memory, and executes the instructions. The processor 319 also receives input from and forwards output to, for example, the ID license storage 320, the content storage 330, the key license storage 340 and the device specification storage 350. The processor 319 may also compose notifications to a user device 101, 102 or a network gateway 110. The notifications to a user device 101, 102 may be, for example, that the attempted distribution or utilization of the content is not permitted, or the notification may be a referral to an external content distribution system 122 or digital rights management system 350 to obtain a valid license to receive or send the content. The notifications to the network gateway 110 may be, for example, authorization to allow a requesting user device 101, 102 to send, receive or utilize the content as requested.

Figure 5:
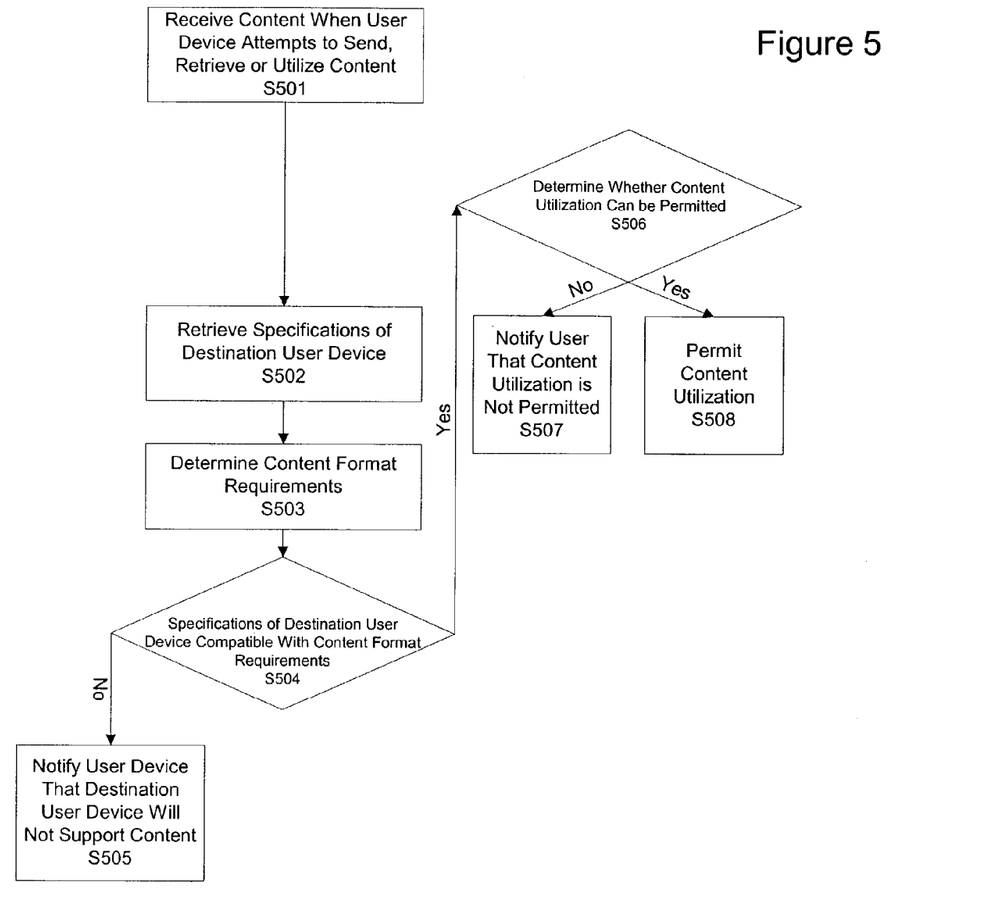
FIG. 5 is a flow diagram showing a method of determining whether a content utilization is permitted and can be completed, according to an aspect of the present invention.

FIG. 5 shows a flow diagram for determining whether a content distribution or utilization is permitted and can be completed. The process starts at S501 when a user device 101, 102 requests to send, retrieve or utilize content, and the content is received at the proxy permission and completion system 300. A process to determine whether the attempted distribution or utilization of the content can be completed begins at S502 when specifications of a destination user device 101, 102 are retrieved. The memory and processing requirements for the data are determined at S503 by, for example, inspecting the content to determine the content's format and size. A determination is made at S504 whether the specifications of the destination user device 101, 102 will support utilization of the content according to the content requirements.

If the user device 101, 102 is not compatible with the content, the user device 101, 102 is notified that it will not support the content at S505. Of course, if the system for network based content utilization can support the utilization of the content by processing the content and forwarding the processed content to the user device 101, 102, the system may offer the user device 101, 102 the option of receiving processed content. Additionally, if the user device 101, 102 merely requires, for example, a media player to process the content, the system may offer to download the necessary media player to the user device 101, 102. In the embodiment of FIG. 5, if the specifications of the user device 101, 102 are compatible with the content, a determination is made at S506 whether the content utilization can be permitted. If the content utilization can be permitted, content is forwarded to the user device 101, 102 at S508. If the content utilization cannot be permitted, the user device 101, 102 is notified that the attempted utilization is not permitted at S507.

Figure 6:
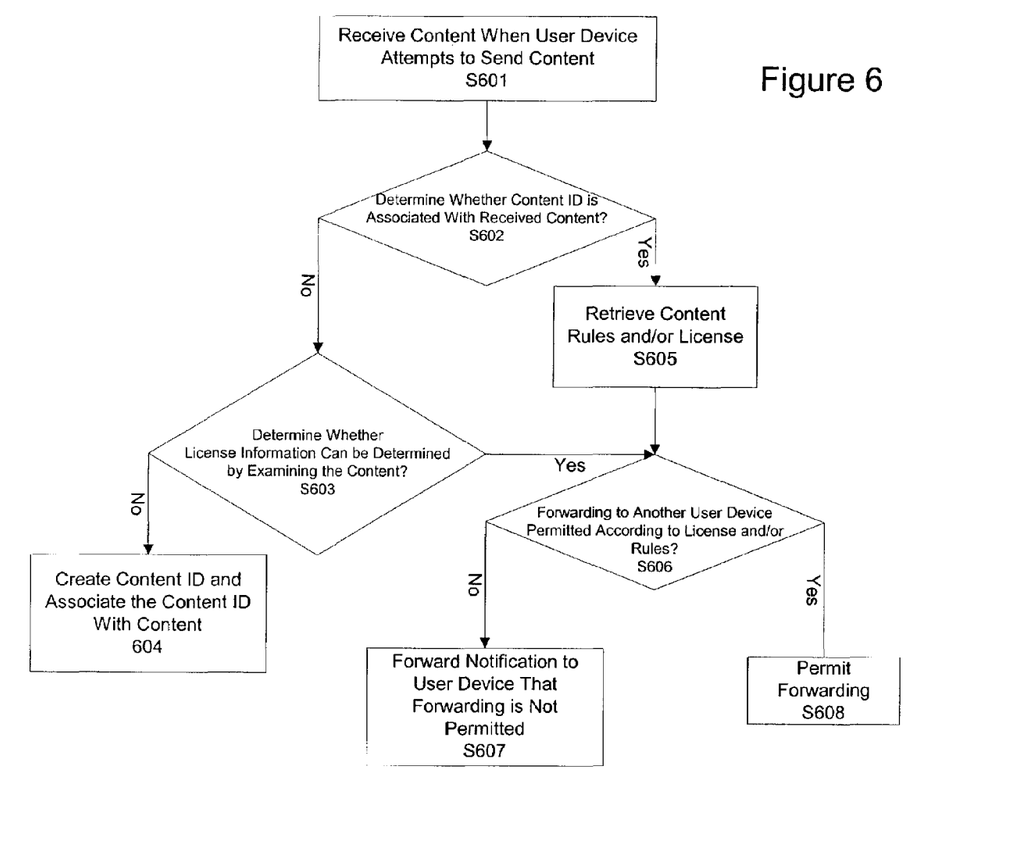
FIG. 6 is a flow diagram showing a method of determining whether a content forwarding operation is permitted, according to an aspect of the present invention.

FIG. 6 shows a flow diagram for determining whether an attempted content distribution is permitted. At S601, the system for network based content utilization receives content. At S602, the system determines whether the content is associated with a content ID. If a content ID is not found for the content, a determination is made whether license information can be determined by examining the content at S603. For example, the system for network based content utilization will process the content to search for a digital watermark or other content identifier that indicates the presence of a digital rights management scheme or an assertion of content ownership rights. If a license information cannot be determined by examining the content, the system may also search for a content notice that indicates an ownership interest in limiting distribution or utilization of the content. The content notice may be a notice to contact a third party, such as the digital rights management system 350 or the content distribution system 122, if license information cannot be determined for the content. If a content ID, license information and a content notice are not found, a content ID is created and associated with the content at S604.

If a content ID is found with the received content at S602, an associated license and/or content rules for the content is retrieved at S605. When licensing information is determined at S603, or after the license and/or content rules are retrieved at S605, a determination is made at S606 whether content forwarding is permitted. If content forwarding is not permitted, the user device 101, 102 is notified at S607 that the attempted utilization of the content is not permitted. If content forwarding is permitted, the network gateway is instructed to proceed with the forwarding operation requested by the user device 101, 102 at S608.

Figure 7:
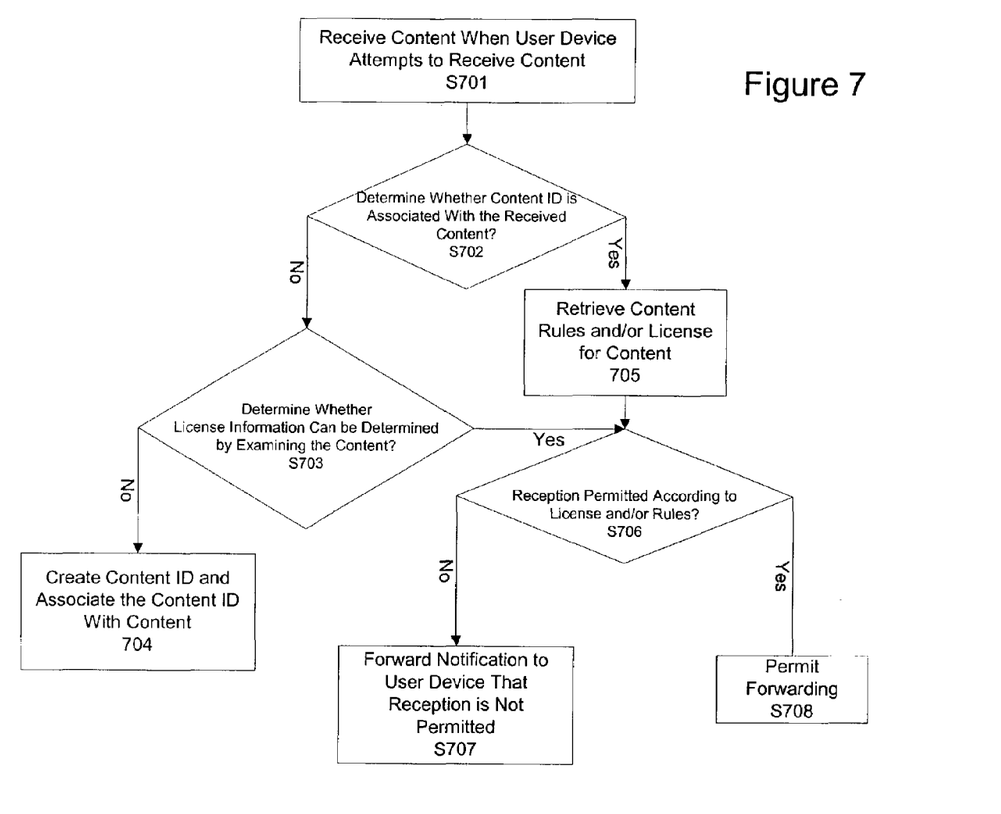
FIG. 7 is a flow diagram showing a method of determining whether a content reception operation is permitted, according to an aspect of the present invention.

FIG. 7 shows a flow diagram for determining whether an attempted content reception is permitted. At S701, the system for network based content utilization receives content. At S702, the system determines whether the content is associated with a content ID. If a content ID is not found for the content, a determination is made whether license information can be determined by examining the content at S703. For example, the system for network based content utilization will process the content to search for a digital watermark or other content identifier that indicates the presence of a digital rights management scheme or an assertion of content ownership rights. If license information is not found, a content ID is created and associated with the content at S704.

If a content ID is found with the received content at S702, an associated license and/or content rules for the content are retrieved at S705. When licensing information is determined at S703, or after the license and/or content rules are retrieved at S705, a determination is made at S706 whether the content reception is permitted. If the content reception is not permitted, the user device 101, 102 is notified at S707 that the attempted reception of the content is not permitted. If content reception is permitted, the network gateway is instructed to proceed with the reception operation requested by the user device 101, 102 at S708.

Figure 8:
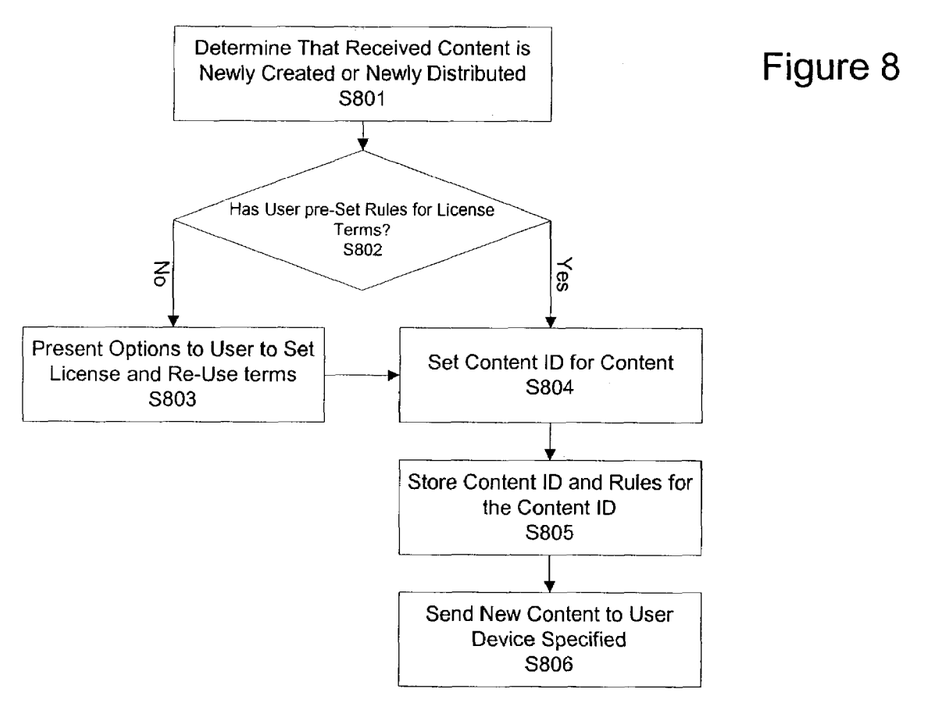
FIG. 8 is a flow diagram showing a method of setting license terms for newly created or newly distributed content, according to an aspect of the present invention.

FIG. 8 shows a flow diagram for setting license terms for newly created or newly distributed content. The process for setting license terms begins at S801 when the system for network based content utilization has determined that license terms have not been set for content received at the proxy permission and completion system 300. At S802, a determination is made whether an owner of the content has pre-set rules for setting license terms. The owner of the content may be presumed by the system to be a party passing control of the content (i.e., a distributing party) when a content ID, a license, and a content notice are not associated with the content. In the case of content created by a user, the user may have pre-set rules for setting license terms for content. For example, a user may instruct that email content is not to be distributed beyond the address(es) specified in the original distribution.

If pre-set rules have not been set for license terms, the proxy permission and completion system 300 forwards options to the user to set license and re-use terms at S803. When the content owner sets license and re-use terms at S803, or when rules have been pre-set by the content distributor (i.e., sender), a content ID is created for the content and associated with the content at S804. At S805, the system stores the content ID and the associated license rules for the content ID. Finally, the proxy permission and completion system 300 instructs the network gateway to distribute the content as requested by the user device 101, 102 at S806.

Thus, according to the architecture diagrams of FIGS. 1-4 and the flow diagrams of FIGS. 5-8, the system for network based proxy control of content ensures that content rights are enforced on a communications network for owners of content that is distributed or utilized over the communications network. As should be clear, the processes shown in the flow diagrams of FIGS. 5-8 can be performed in a different order. Moreover, additional processes can be performed to determine and enforce content rights using a network based content utilization system as described herein.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, or parallel processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for wireless networks (e.g., CDMA, TDMA, GSM), content formats (e.g., PDF, JPEG, MPEG, WAV, HTML), internet and other packet switched network transmissions (e.g., TCP/IP) represent examples of the state of the art. Such standards are periodically superseded by faster or more efficient equivalents having essentially the same functions. Accordingly, replacement standards and protocols having the same functions are considered equivalents.

What is claimed is:

1. A communications system for enabling content utilization by a first end user device in a communications network, the communications system adapted to communicate with a content distribution system or a digital rights management system, the communications system comprising:
    at least one network gateway that receives content from a second end user device in response to a user initiated attempt to utilize the content from the first end user device; and
    a computer that serves as a proxy for the first and second end user devices and that receives the content from the second end user device via the network gateway for distributing the content to the first end user device, the computer including:
        a format determining module that determines, from the content, whether a format of the content is supported by the first end user device; and
        a content utilization module that determines, from the content, whether content utilization by the first end user device is permitted,
    wherein the content is distributed from the computer to the first end user device without contacting the content distribution system or the digital rights management system, if the computer determines both that the format of the content is supported by the first end user device and content utilization by the first end user device is permitted.

2. The communications system of claim 1,
    wherein the computer determines whether the content utilization is permitted based upon an ID provided with the content.

3. The communications system of claim 1, the communications system further comprising:
    a memory that stores information used to determine whether the content utilization is permitted.

4. The communications system of claim 1, the communications system further comprising:
    a digital rights manager that stores digital fights management information related to the content,
    wherein the digital fights manager is queried in response to the computer receiving the content.

5. The communications system of claim of claim 1,
    wherein the computer determines whether the content utilization can be completed based upon an ID provided with the content.

6. The communications system of claim 1, the communications system further comprising:
    a memory that stores information used to determine whether the content utilization can be completed.

7. The communications system of claim 1,
    wherein the computer determines whether the content utilization can be completed based upon data processing requirements of the content.

8. The communications system of claim 1, wherein the computer determines whether the content distributed to the first end user device can be forwarded from the first end user device to a third end user device.

9. The communications system of claim 2,
    wherein the communications system retrieves information associated with the ID, the information being used to determine whether the content utilization is permitted.

10. The communications system of claim 3,
    wherein the information includes license data.

11. The communications system of claim 3,
    wherein the information includes business rules data.

12. The communications system of claim 4,
    wherein a response to the query includes information used to determine whether the content utilization is permitted.

13. The communications system of claim 5,
    wherein the computer receives information associated with the ID, the information being used to determine whether the content utilization can be completed.

14. The communications system of claim 6,
    wherein the information includes capability information describing capabilities of the first end user device.

15. The communications system of claim 9,
    wherein the communications system determines whether an owner of the content has permitted the content utilization.

16. The communications system of claim 12,
    wherein if the content utilization is permitted, the communications system determines whether the content utilization can be completed.

17. A method for determining whether a first end user device is permitted to receive content from a second end user device via a communications network, the communications network adapted to communicate with a content distribution system or a digital rights management system, the method comprising:

receiving, at a proxy, the content from the second end user device via a network gateway of a communications service provider in response to a user initiated attempt to utilize the content at the first end user device, wherein the proxy serves as a proxy for at least one other end user device that may also attempt to utilize the content; and determining, at the proxy, from the received content, whether a format of the content is supported by the first end user device, and whether content utilization by the first end user device is permitted;

wherein the content is distributed from the proxy to the first end user device without contacting the content distribution system or the digital rights management system, if the proxy determines that both the format of the content is supported by the first end user device and content utilization by the first end user device is permitted.

18. The method of claim 17,
wherein the determining is based upon an ID provided with the content.

19. The method of claim 17, further comprising:
in response to receiving the content at the proxy, querying a digital rights manager that stores digital rights management information related to the content.

20. The method of claim 17, further comprising:
storing information used to determine whether the content utilization can be completed.

21. The method of claim 17, further comprising:
determining whether the content utilization can be completed based upon data processing requirements of the content.

22. The method according to claim 17, further comprising:
managing distribution of the content to prohibit unlicensed or unauthorized distribution of the content.

23. The method of claim 17, wherein the proxy determines whether the content distributed to the first end user device can be forwarded from the first end user device to a third end user device.

24. The method of claim 18, further comprising:
retrieving information associated with the ID, the information being used to determine whether the content utilization is permitted.

25. The method of claim 19,
wherein a response to the query includes information used to determine whether the content utilization is permitted.

26. The method of claim 19, further comprising:
if the content utilization is permitted, determining whether the content utilization can be completed.

27. The method of claim 20,
wherein the stored information includes capability information describing capabilities of the first end user device.

28. The method of claim 26, further comprising:
determining whether the content utilization can be completed based upon an ID provided with the content.

29. The method of claim 28, further comprising:
retrieving information associated with the ID, and determining whether the content utilization can be completed using the retrieved information.

30. A computer readable medium for storing a computer program that determines whether a first end user device is permitted to receive content from a second end user device via a communications network, the communications network adapted to communicate with a content distribution system or a digital rights management system, the computer readable medium comprising:

a content receiving code segment that, when executed, transmits the content from the second end user device to a proxy via a network gateway of a communications service provider in response to a user initiated attempt to utilize the content at the first end user device; and a permission determining code segment that, when executed, determines, at the proxy and in response to transmitting the content to the proxy, whether content utilization by the first end user device is permitted and whether a format of the content is supported by the first end user device, wherein the proxy serves as a proxy for at least one other end user device that may also attempt to utilize the content, wherein the content is distributed from the proxy to the first end user device without contacting the content distribution system or the digital rights management system, if the permission determining code segment determines that both the format of the content is supported by the first end user device and content utilization by the first end user device is permitted.

31. The computer readable medium of claim 30, further comprising:
an information storing code segment that, when executed, stores information used to determine whether the content utilization is permitted.

32. The computer readable medium of claim 30, further comprising:
a management querying code segment that, when executed, queries, in response to the content being transmitted to the proxy, a memory that stores digital rights management information related to the content.

33. The computer readable medium of claim 30, further comprising:
an information retrieving code segment that, when executed, retrieves information associated with an ID that is provided with the content and determines whether the content utilization can be completed using the retrieved information.

34. The computer readable medium of claim 30, wherein the permission determining code segment determines whether the content distributed to the first end user device can be forwarded from the first end user device to a third end user device.

35. The computer readable medium of claim 32, further comprising:
a completion determining code segment that, when executed, determines, if the content utilization is permitted, whether the content utilization can be completed.

* * * * *

UNITED STATES PATENT AND TRADEMARK OFFICE
CERTIFICATE OF CORRECTION

PATENT NO.      : 7,725,582 B2                                          Page 1 of 1
APPLICATION NO. : 10/339310
DATED           : May 25, 2010
INVENTOR(S)     : D. Nadarajah

It is certified that error appears in the above-identified patent and that said Letters Patent is hereby corrected as shown below:

At column 18, line 16 (claim 4, line 3) of the printed patent, "fights" should be --rights--.

At column 18, line 18 (claim 4, line 5) of the printed patent, "fights" should be --rights--.

Signed and Sealed this

Seventh Day of September, 2010

David J. Kappos
*Director of the United States Patent and Trademark Office*